(12) United States Patent
Moon

(10) Patent No.: US 7,319,807 B2
(45) Date of Patent: Jan. 15, 2008

(54) VCR AND OPTICAL DISK COMPOSITE MEDIUM REPRODUCING APPARATUS AND MEDIUM CONTROL METHOD USING THE SAME

(75) Inventor: Kyoung-Hee Moon, Seoul (KR)

(73) Assignee: LG Electronics Inc., Seoul (KR)

( * ) Notice: Subject to any disclaimer, the term of this patent is extended or adjusted under 35 U.S.C. 154(b) by 957 days.

(21) Appl. No.: 10/445,877

(22) Filed: May 28, 2003

(65) Prior Publication Data

US 2003/0231860 A1    Dec. 18, 2003

(30) Foreign Application Priority Data

May 29, 2002    (KR)    ............... 10-2002-0029991

(51) Int. Cl.
  *H04N 5/91*    (2006.01)
  *H04N 5/00*    (2006.01)
  *H04N 5/268*    (2006.01)

(52) U.S. Cl. .................. 386/46; 386/125; 386/126; 348/705

(58) Field of Classification Search ................ 386/12, 386/46, 94, 95, 125, 126
See application file for complete search history.

(56) References Cited

U.S. PATENT DOCUMENTS

| | | | |
|---|---|---|---|
| 5,587,849 A * | 12/1996 | Kori et al. ............... | 360/69 |
| 2002/0168172 A1 * | 11/2002 | Kim ....................... | 386/46 |
| 2002/0172501 A1 * | 11/2002 | Han ....................... | 386/94 |
| 2003/0206711 A1 * | 11/2003 | Berkheimer et al. ...... | 386/46 |

* cited by examiner

*Primary Examiner*—Thai C. Tran
*Assistant Examiner*—Syed Y. Hasan
(74) *Attorney, Agent, or Firm*—Ked & Associates LLP

(57) ABSTRACT

A VCR and optical disk composite medium reproducing apparatus include a key input unit for outputting a command signal upon receiving a user's selection command on an operation mode, and a controller that preferably directly selects a reproducing operation according to a new medium insertion and can output a control signal if the new reproducing medium is inserted while one medium is being reproduced in a DVD unit or in a VCR unit corresponding to the command signal of the key input unit. In such a composite medium recording apparatus and method for using same, the medium can be reproduced effectively and conveniently.

48 Claims, 4 Drawing Sheets

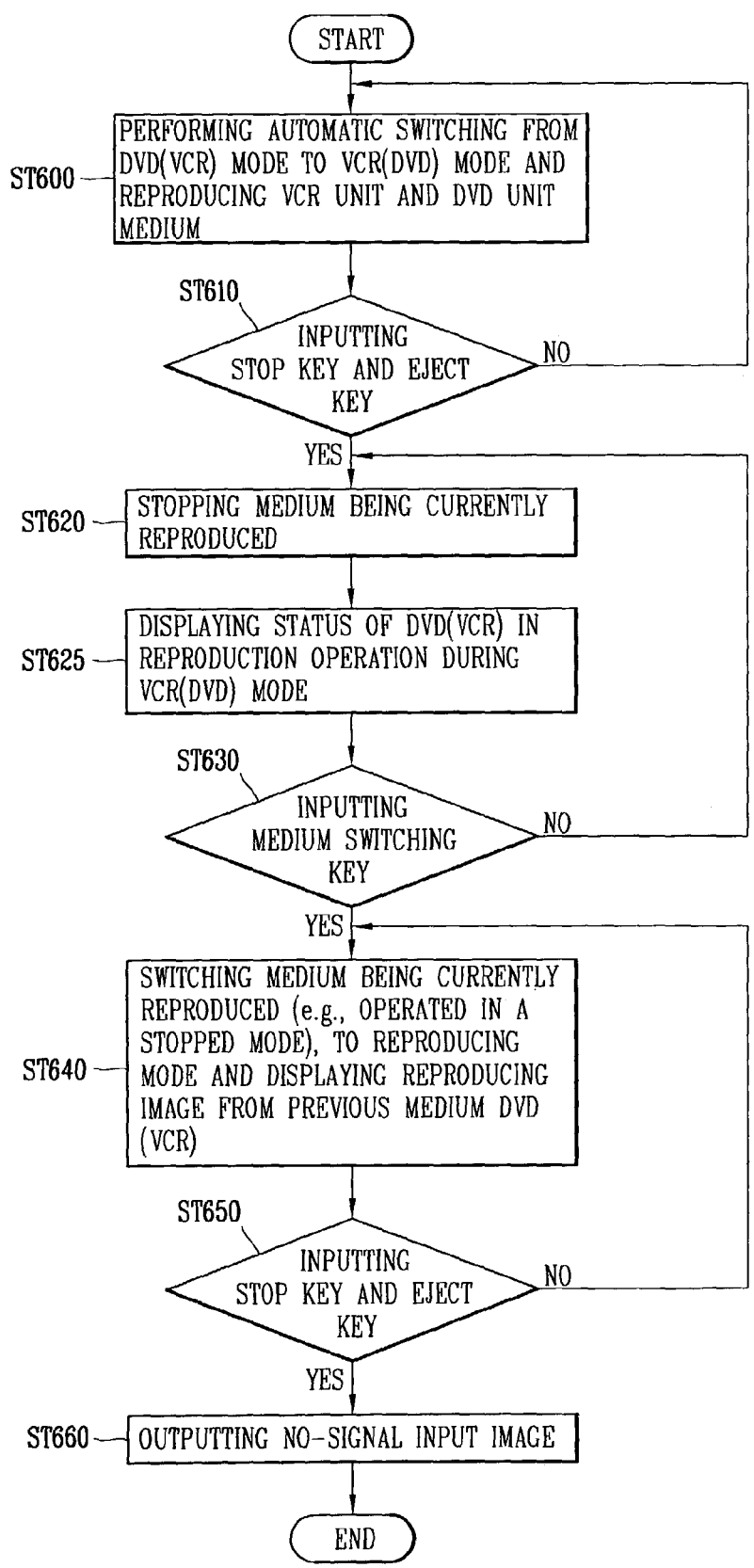

VCR AND OPTICAL DISK COMPOSITE MEDIUM REPRODUCING APPARATUS AND MEDIUM CONTROL METHOD USING THE SAME

BACKGROUND OF THE INVENTION

1. Field of the Invention

The present invention relates to a composite medium reproducing apparatus and method, and more particularly, to a VCR and optical disk composite medium reproducing apparatus and method.

2. Background of the Related Art

In general, a medium reproducing apparatus that performs a display by using a medium includes a Video Cassette Recorder (VCR) and a Digital Versatile/Video Disk Player (DVDP). The VCR includes a function of reproducing an image and a sound data recorded on a magnetic tape and a function of recording a signal received from outside on the magnetic tape. The DVDP generates an image and/or a sound data recorded in an optical recording medium such as a video/audio CD (Compact Disc), a VCD (Video Compact Disc), a DVD (Digital Versatile/Video Disc) and the like by using an MPEG2 compression technology.

The characteristics of the DVDP include performing a high picture quality, performing a high sound quality, having a large capacity and a multi-function. In other words, compared to a conventional medium reproducer (i.e., the VCR), the optical recording medium reproducing apparatus has advantages in that a noise or a distortion according to reproduction and modulation is low, there is little or no ghost and a signal-to-noise ratio is high, so that signals can be reproduced with better picture quality and sound quality. Further, because of a random access availability, the optical recording medium reproducing apparatus (e.g., DVDP) is being quickly popularized.

FIG. 1 is a block diagram showing a construction of a related art medium reproducing system outputting an image and a sound by using the DVDP and the VCR. The related art medium reproducing system of DVDP and VCR is connected to an image/sound output unit 40 through each single product medium reproducing apparatus, e.g., DVDP 30 and and VCR 60, for video and audio reproduction, respectively.

The related art medium reproducing system using DVDP 30 and VCR 60 includes a DVDP 30 for reproducing an optical disk medium and a VCR 60 for reproducing a magnetic tape medium. An image/sound outputting unit 40 is for respectively receiving a user's command through key input units 20 and 50 and outputting an image or a sound reproduced from the DVDP 30 and VCR 60.

The related art DVDP and VCR medium reproducing system is constructed such that video and audio signals reproduced by the DVDP 30 or the VCR 60 are outputted through an output terminal of each device by manipulating individual functions between the VCR 60 and the DVDP 30. Accordingly, to switch the reproduction mode between the VCR 60 and the DVDP 30, a user should turn on one medium reproducing apparatus to be reproduced of the VCR 60 and the DVDP 30 through a key input operation and turn off the other medium reproducing apparatus.

As described above, the related art DVDP and VCR medium reproducing system has various disadvantages. For example, if reproduction of an optical disk medium needs to be stopped to reproduce a magnetic tape medium or if reproduction of the magnetic tape medium needs to be stopped to reproduce the optical disk medium, the user should stop driving of the medium reproducing apparatus currently undergoing reproducing and then drive the medium reproducing apparatus, which is desired to be reproduced, with an input unit such as a key matrix or a remote-controller.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the present invention is to provide an optical disk composite medium reproducing apparatus and method that directly switches a reproduction mode.

Another object of the present invention is to provide a VCR and optical disk composite medium reproducing apparatus and method that is capable of being automatically switched to a reproduction mode upon recognizing a new medium as inserted and determining a state of a medium that is being currently reproduced.

To achieve at least these and other advantages in a whole or in part and in accordance with the purpose of the present invention, as embodied and broadly described herein, there is provided a medium control apparatus that includes a key input unit for outputting a command signal upon receiving a user's selection command on an operation mode; and a controller for automatically selecting a reproducing operation according to a new medium insertion and outputting a control signal if the new reproducing medium is inserted while one medium is being reproduced in a DVD unit or in a VCR unit corresponding to a command signal of the key input unit.

To further achieve the above objects in a whole or in part, there is provided a medium control method that includes receiving a user's selection command on an operation mode and reproducing one medium in a DVD unit or in a VCR unit automatically performing a reproducing operation according to another medium insertion if the latter medium is newly inserted while the former medium is being reproduced and switching or stopping the operation of the medium that is being currently reproduced in response to a user's key input and displaying it on a screen.

To further achieve the above objects in a whole or in part, there is provided composite medium reproducing apparatus having first and second devices for reproducing a data recording medium that includes a key input unit configured to output a command signal upon receiving a user's selection command in an operation mode and a controller configured to directly switch a reproducing operation according to a new medium insertion into the first device while the second device is currently performing the reproducing operation.

To further achieve the above objects in a whole or in part, there is provided a control method of a composite medium reproducing apparatus having first and second devices for reproducing a data recording medium that includes receiving a user's selection command in an operation mode to perform reproducing of a first medium in the first device and automatically switching the reproducing according to insertion of a second medium when the second medium is inserted into the second device and the first device is performing the reproducing of the first medium.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 5 is a flow chart showing an exemplary operation of a medium in response to a user's key input when a composite medium is reproduced in accordance with preferred embodiments.

DETAILED DESCRIPTION OF PREFERRED EMBODIMENTS

Preferred embodiments of a composite medium reproducing apparatus (e.g., a VCR and optical disk) in accordance with the present invention and a medium control methods using the same will now be described. Preferred embodiments according to the present invention can beneficially provide users' convenience by combining organically a VCR and an optical disk medium reproducing apparatus and method to thereby supplement their functions.

Figure 1:
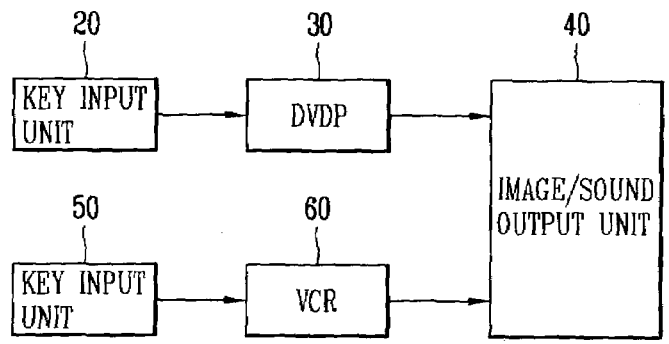
FIG. 1 is a schematic block diagram of a related art medium reproducing system that outputs an image or a sound independently by using a DVDP or a VCR.
Figure 2:
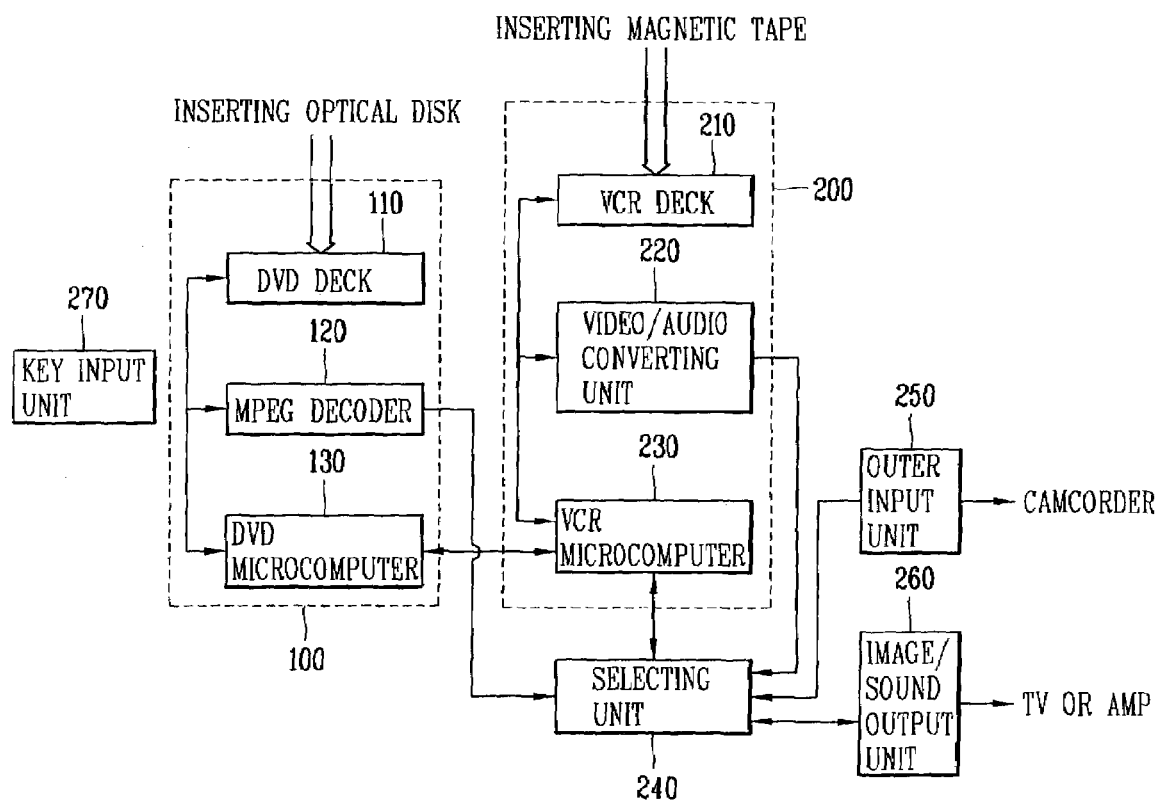
FIG. 2 is a schematic block diagram showing a preferred embodiment of a VCR and optical disk composite medium reproducing apparatus in accordance with the present invention.

FIG. 2 is a schematic block diagram showing a preferred embodiment of a VCR and optical disk composite medium reproducing apparatus in accordance with the present invention. As shown in FIG. 2, a VCR and optical disk composite medium reproducing apparatus can include a DVD unit 100, a VCR unit 200, a selecting unit 240, a video/sound output unit 260, an outer input unit 250 and a key input unit 270. The DVD unit 100 can have a DVD deck 110 for reading a data recorded in an optical recording medium and outputting a reproduction signal, an MPEG decoder 120 for receiving an output value of the DVD deck 110 and decoding it to an image signal and a sound signal, and a DVD microcomputer 130 for controlling a generation operation of the DVD deck 110 and the MPEG decoder 120. The VCR unit 200 can include a VCR deck 210 for recording an image signal or a sound signal in a magnetic tape or reproducing an image signal or a sound signal recorded in the magnetic tape, a video/audio converting unit 220 for receiving an output of the VCR deck 210 and converting it to a recording format or to a format possibly recognized by an output device, and a VCR microcomputer 230 for controlling a generation operation in association with the VCR deck 210, the video/audio converting unit 220 and the DVD microcomputer 130 of the DVD unit 100. The selecting unit 240 preferably selects an output value received from the video/audio converting unit 220 or from the MPEG decoder 120 and outputs a video and audio signal under the control of the VCR microcomputer 230. The video/sound output unit 260 preferably outputs an image and audio reproducing signal upon receiving an output value from the selecting unit 240, and the outer input unit 250 preferably provides an image and audio signal inputted from an outer device such as a camcorder. The key input unit 270 can output a command signal to the DVD microcomputer 130 or to the VCR microcomputer 230 according to a user's key input on an operation mode.

The VCR deck 210 may record a video signal or an audio signal on the magnetic tape or reproduce a video signal or an audio signal recorded on the magnetic tape depending on the strength of magnetism. In other words, the VCR deck 210 detects an indication such as whether a tab or the like for a recording has been attached at a magnetic tape medium. If the tab has been attached, the VCR deck 210 outputs a signal for recording or reproducing a video signal or an audio signal to the VCR microcomputer 230. If, however, the indication or the tab has been removed, the VCR deck 210 outputs a signal for reproducing to the VCR microcomputer 230.

Operations of the VCR and optical disk composite medium reproducing apparatus constructed as described above will now be described. To begin with, operation modes can include a mode for the DVDP unit 100 to reproduce an image or a sound data recorded in the optical recording medium, a mode for the VCR unit 200 to reproduce an image or a sound data recorded on the magnetic tape or record a signal received from the outer device on the magnetic tape, and a mode for the VCR unit 200 to record an image or sound reproduced from the DVDP unit 100 on the magnetic tape.

The mode for reproducing an image and a sound data recorded on the optical recording medium will now be described. First, a DVD operation mode is preferably inputted to the key input unit 270 through a key input device such as a key matrix or a remote-controller. The DVD deck 110 can read a data recorded in the optical recording medium and outputs a corresponding reproduction signal to the MPEG decoder 120. The MPEG decoder 120 preferably decodes the reproduction signal and outputs decoded video or audio signal to the selecting unit 240. The selecting unit 240 can output the decoded signal received from the MPEG decoder 120 to a display device such as a TV preferably under the control of the VCR microcomputer 230, and performing a reproduction of an optical disk can be completed.

The mode for reproducing an image or a sound data recorded on the magnetic tape will now be described. First, a VCR operation mode is preferably inputted to the key input unit 270 through the key input device such as the key matrix or the remote-controller. The VCR deck 210 can read a data recorded in the magnetic tape medium and output a corresponding reproduction signal to the video/audio converting unit 220. Upon receiving the reproduction signal, the video/audio converting unit 220 preferably converts it to a format recognizable by an outer device and outputs it to the selecting unit 240. The selecting unit 240 can output the converted signal received from the video/audio converting unit 220 to the display device such as the TV preferably under the control of the VCR microcomputer 230, and performing a reproduction of the magnetic tape can be completed.

Preferred embodiments of a VCR and optical disk composite medium reproducing apparatus and method in accordance with the present invention are preferably configured to automatically perform a reproducing operation according to insertion of a new medium, if the new medium is inserted while an arbitrary medium is being reproduced.

Figure 3:
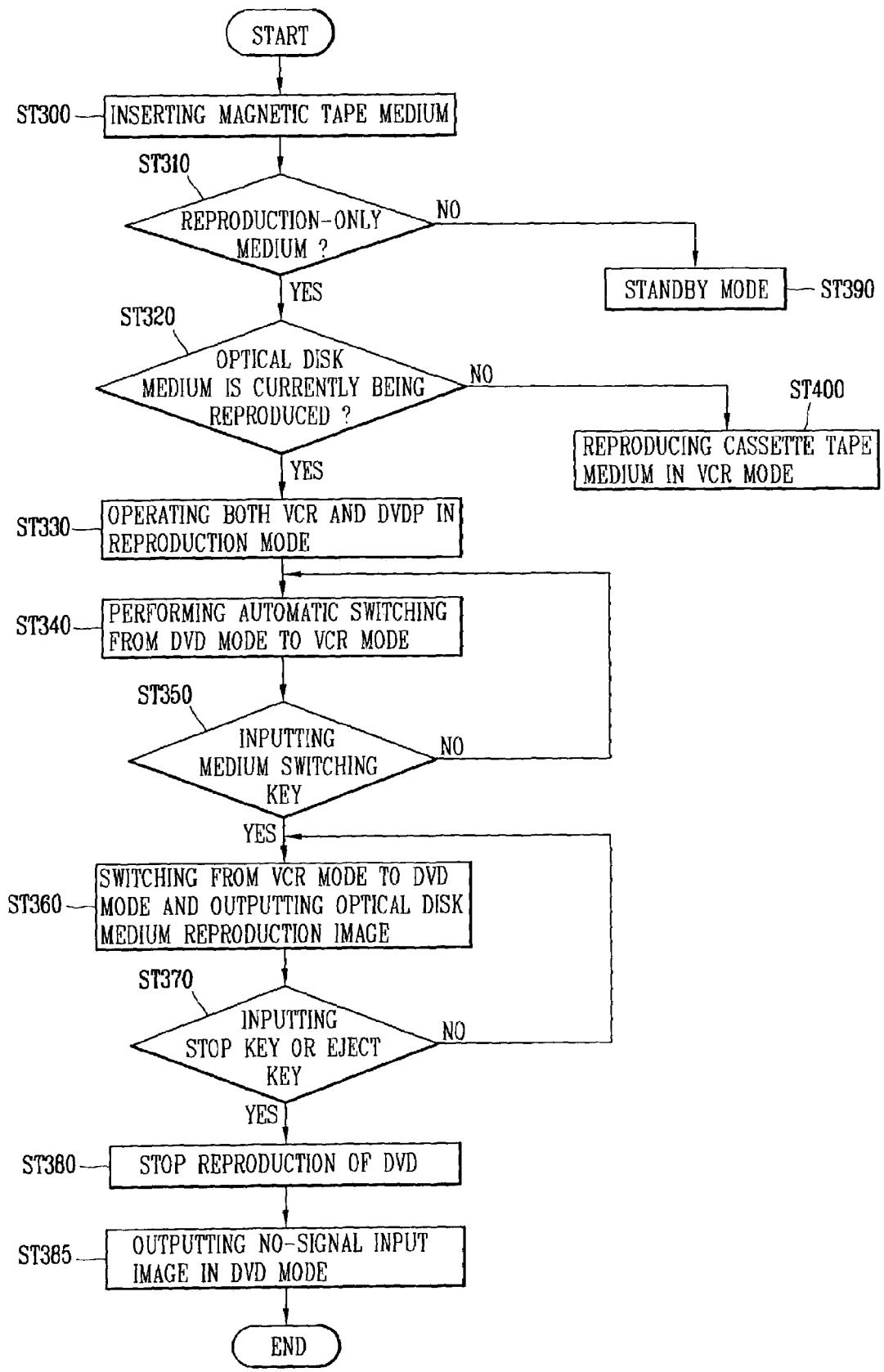
FIG. 3 is a flow chart showing an exemplary operating method of a composite medium reproducing apparatus in accordance with preferred embodiments of the present invention.

FIG. 3 is a flow chart showing a first exemplary control method of a VCR and optical disk composite medium reproducing apparatus in accordance with preferred embodiments of the present invention. As shown in FIG. 3, the first exemplary control method can be incorporated into a VCR and optical disk composite medium reproducing apparatus as shown in FIG. 2. As shown in FIG. 3, after a process starts, when the magnetic tape medium is inserted in the VCR deck 210, preferably the VCR deck 210 can judge whether the medium is a reproduction-only medium depending on attachment of a tab or the like. If the tab is attached, the VCR deck 210 can output a signal for recording or reproducing a video signal and an audio signal to the VCR microcomputer 230. If, however, there is no tab, the VCR deck 210 can output a signal for performing a reproduction to the VCR microcomputer 230 (steps ST300 and ST310).

When the medium is recording or reproducing (e.g., the tab is attached) because the VCR microcomputer 230 can't recognize the user's intention as to whether to record or reproduce, the VCR microcomputer 230 preferably sets a standby mode until a control command is received by the user's key input and terminates the process (step ST390).

When the medium is determined to be reproduction only (step ST310), for example by being inserted without the tab, the VCR microcomputer 230 can judge whether some other medium is being reproduced in association with the DVD microcomputer 130 (step ST320). If the determination is that no additional medium is currently reproduced (step ST320), the VCR microcomputer 230 preferably outputs a control for reproducing only a cassette tape medium in a VCR mode to the selecting unit 240 (step ST400).

If the determination is that some other medium is being reproduced (step ST320), the VCR unit 110 and the DVDP unit 200 are all operated in a reproduction mode (step ST330). At the same time, the VCR microcomputer 230 outputs a control signal for an automatic switching from the DVD reproduction mode to the VCR reproduction mode to the selecting unit 240 to output a video and an audio signal of the VCR to a display device such as the TV to reproduce an image (step ST340).

Thereafter, a user's key input can be determined. According to the user's key input of a medium switching mode, the medium is preferably switched from the VCR reproduction mode in which the reproduction is being currently made to an optical disk reproduction mode to output a video and an audio signal of an optical disk to the display device, thereby performing a reproduction of an image (steps ST350 and ST360). After the performance of the medium switching mode (e.g., before step ST370) preferably the VCR unit 110 and the DVDP unit 200 are all operated in a reproduction mode.

While the image of the optical disk is being reproduced, a user's key input can be determined. If the user inputs a stop key or an eject key, operations of the optical disk medium that is being currently reproduced is preferably stopped in response to the key input (steps ST370 and ST380). Accordingly, until a control command or the like is inputted by a user's key input, no-signal input image can be displayed on the current screen (step ST385). Then, the process can be completed.

Figure 4:
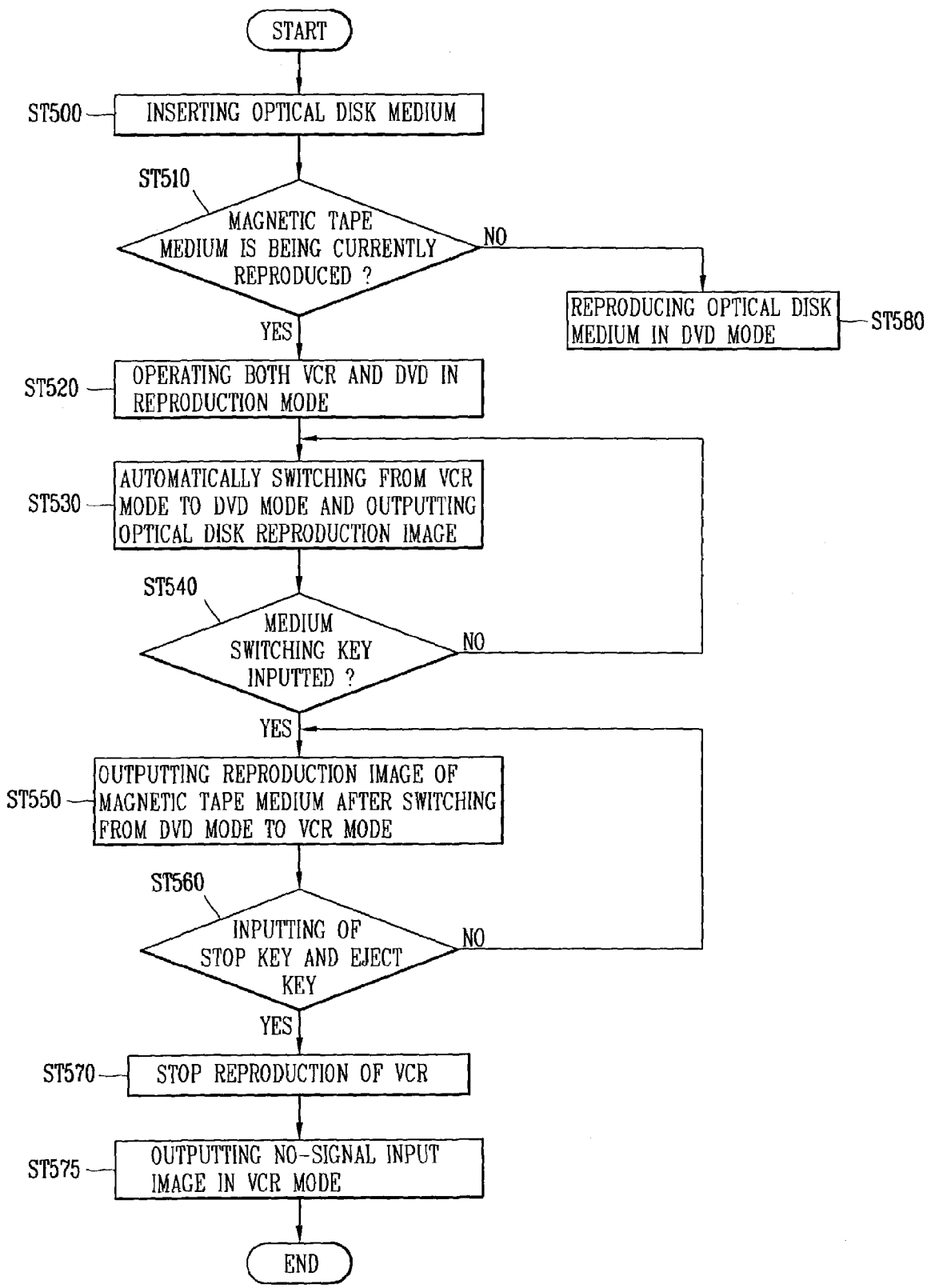
FIG. 4 is a flow chart showing an exemplary control method of a composite medium reproducing apparatus according to insertion of an optical disk medium in accordance with preferred embodiments.

FIG. 4 is a flow chart showing a second exemplary control method of a composite medium reproducing apparatus (e.g., the VCR and optical disk composite medium reproducing apparatus shown in FIG. 2) according to preferred embodiments of the present invention. After a process starts, as shown in FIG. 4, when an optical disk medium is inserted in the DVD deck 110, the DVD deck 110 reads a data recorded in the optical recording medium and outputs a reproduction signal to the MPEG decoder 120. At the same time, the DVD microcomputer 130 preferably judges whether some other medium is currently being reproduced in association with the VCR microcomputer 230, and outputs a control signal for a medium reproduction (steps ST500 and ST510). If the judgment determines no additional medium is being currently reproduced (step ST510), the DVD microcomputer preferably outputs a control signal for reproducing only the optical disk medium in the DVD mode to the selecting unit 240 (step ST580).

If the judgment determines the magnetic tape medium is being reproduced (step ST510), the DVD microcomputer can operate both the VCR unit and the DVDP unit in the reproduction mode (step ST520). The VCR microcomputer 230 preferably outputs a control signal for a mode switching to the selecting unit 240 for a direct switching from the VCR mode to the DVD mode according to the new medium insertion. Then, the selecting unit 240 can receive a reproduction signal from the MPEG decoder 120 and output a video and an audio signal of the optical disk medium to the display device such as the TV to perform a reproduction of an image (step ST530).

Thereafter, a user's key input can be determined. When the user's key input is preferably determined to be a medium switching mode, the medium can be switched from the DVD mode in which the reproduction is being currently made to the VCR mode to output a video and an audio signal of the VCR unit 200 to the display device, thereby performing a reproduction of a magnetic tape medium reproduced image (steps ST540-ST550). After the performance of the medium switching mode (e.g., before step ST560) preferably the VCR unit 110 and the DVDP unit 200 are all operated in a reproduction mode.

While the image is being reproduced, if the user inputs a stop key or an eject key, operations of the VCR unit that is being currently reproduced is stopped in response to the key input (steps ST560 and ST570). Accordingly, until a control command is inputted by a user's key input, a no-signal input image or the like can be displayed on the current corresponding screen (step ST575). From steps ST575 and ST580, the process can be terminated.

FIG. 5 is a flow chart showing an exemplary control operation of a composite medium reproducing apparatus (e.g., a VCR and optical disk composite medium) in accordance with preferred embodiments of the present invention. As shown in FIG. 5, in the VCR and optical disk composite medium reproducing apparatus shown in FIG. 2 for example, a process starts when another medium is inserted while one medium is being reproduced, and a mode switching is automatically performed to display a reproduction image of the newly inserted medium. In this case, the VCR unit 100 and the DVDP unit 200 are preferably both operated in the reproduction mode internally (step ST600).

Thereafter, a user input can be monitored. The medium that is being currently reproduced is preferably stopped and outputs no-signal input image according to the user's input of a stop key or an eject key, while the other medium outputs on a screen in the reproduction operation (steps ST610, ST620 and ST625). For example, the other medium could use an On Screen Display (OSD) function or the like to display a message such as "VCR is in a reproduction state" on a display screen or monitor when the stop/eject signal is received in the DVD mode.

Thereafter, a user input can be monitored. If there is a key input for a medium switching from the user, the currently reproducing medium is preferably switched to output a reproduction image from the previously reproducing medium (steps ST630 and ST640).

Subsequently, the user action can be monitored. Operations of the medium being currently reproduced can then be stopped in response to the user's input of the stop key or the eject key, and no-signal input image can be displayed on the screen until a control command is newly inputted by a user's key input (steps ST650 and ST660). From step ST660, a process can be completed.

As described above, preferred embodiments of a composite medium including a VCR and optical disk composite medium reproducing apparatus and methods thereof according to the present invention have various advantages. When another medium is inserted while one medium is being reproduced, even though the user does not depress a reproduction stop button of the reproduction unit of the medium that is being currently reproduced and a reproduction button of the reproduction unit of the newly inserted medium, the inserted medium is recognized and compared with the medium being currently reproduced so that stopping and reproduction of the mediums can be automatically made simultaneously. According to preferred embodiments, a newly inserted medium can be directly reproduced effectively and conveniently.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A VCR and optical disk composite medium reproducing apparatus having a DVD unit for reproducing an optical recording medium and a VCR unit for reproducing a magnetic tape medium, comprising:
   a key input unit configured to output a command signal upon receiving a user's selection command in an operation mode; and
   a controller configured to automatically select a reproducing operation when a new medium is inserted into one unit of the DVD unit and the VCR unit while one medium is being reproduced in the other unit of the DVD unit and the VCR unit.

2. The apparatus of claim 1, wherein when the new medium is inserted, the controller outputs a control signal to the other unit corresponding to the command signal of the key input unit.

3. The apparatus of claim 2, wherein when the new medium is inserted, the other unit maintains a reproduction mode, and wherein the controller sets the reproducing operation to the other unit and stops the reproducing operation of the one unit upon receipt of a switch command signal from the key input unit.

4. The apparatus of claim 3, wherein the one unit outputs a null signal upon receipt of a stop/eject command.

5. The apparatus of claim 1, wherein the other unit maintains a reproduction mode and wherein the controller display a message using an On Screen Display (OSD) upon receipt of a stop/eject command for the one unit.

6. The apparatus of claim 5, wherein the controller sets the reproducing operation to the other unit and stops the reproduction mode of the one unit upon receipt of a switch command signal from the key input unit.

7. The apparatus of claim 6, wherein the other unit outputs a null signal upon receipt of a stop/eject command.

8. The apparatus of claim 1, further comprising:
   a selector that selects an output value received from the VCR unit or from the DVD unit under the control of the controller and outputs a video signal and an audio signal;
   an image/sound output unit that outputs a video and audio reproduction signal upon receiving the output value from the selector; and
   an input unit that provides a video signal and an audio signal inputted from an external device to the apparatus.

9. The apparatus of claim 8, wherein the input unit includes at least one of a camcorder, a digital camera, and a audio visual device, and wherein the key input unit includes a remote control device and a panel input device.

10. The apparatus of claim 1, wherein the controller comprises:
    a DVD microcomputer that controls operations of the DVD unit; and
    a VCR microcomputer that controls operations of the VCR unit in association with the DVD microcomputer.

11. The apparatus of claim 1, wherein the DVD unit comprises:
    a DVD deck that reads a data recorded in the optical recording medium and outputs a reproduction signal;
    an MPEG decoder that receives the reproduction signal of the DVD deck and decodes and outputs an image signal and a sound signal; and
    a DVD microcomputer that controls operations of the DVD deck and the MPEG decoder.

12. The apparatus of claim 1, wherein the VCR unit comprises:
    a VCR deck that records an audio signal or a video signal on the magnetic tape medium or reproduces the audio signal or the video signal recorded on the magnetic tape;
    a video/audio converting unit that receives an output value of the VCR deck and converts the output value to a recording format or a format recognizable by an outer device; and
    a VCR microcomputer that controls operations in association with the VCR deck, the video/audio converting unit and the DVD unit.

13. The apparatus of claim 12, wherein the VCR deck detects whether a tab has been attached at the magnetic tape medium, and if the tab has been attached, the VCR deck outputs a signal for recording or reproducing the video signal or the audio signal to the VCR microcomputer, and wherein the VCR deck outputs a signal for reproduction to the VCR microcomputer when no tab is detected.

14. A control method of a VCR and optical disk composite medium reproducing apparatus having a DVD unit for reproducing an optical recording medium and a VCR unit for reproducing a magnetic tape medium, comprising:
    receiving a user's selection command in an operation mode and reproducing a first medium in the DVD unit or in the VCR unit; and automatically switching the reproducing operation according to insertion of a second medium if the second medium is newly inserted while the first medium is being reproduced. A method of discouraging the recording of a display of a motion picture of image.

15. The method of claim 14, wherein the first medium reproduction in the DVD unit comprises:
  reading a data recorded on the optical recording medium and outputting a corresponding reproduction signal;
  decoding the reproduction signal and outputting a video signal and an audio signal; and
  receiving the decoded video and audio signals and outputting them to a display device.

16. The method of claim 14, wherein the first medium reproduction in the VCR unit comprises:
  reading a data recorded on the magnetic tape medium and outputting a corresponding reproduction signal;
  receiving the reproduction signal and outputting video and audio signals which have been converted to a format recognizable by an outer device; and
  receiving the video and audio signals and outputting them to a display device.

17. The method of claim 14, wherein, in the automatically switching when the second medium is the magnetic tape medium whether the second medium is for reproduction-only is judged depending on attachment of a tab, wherein when the tab is attached, a signal for recording or reproducing a video signal and an audio signal is outputted, and wherein when the tab is removed, a signal for performing a reproduction is outputted.

18. The method of claim 17, further comprising:
  remaining in a standby mode until a control command is input by a user's key input when the magnetic tape medium with the tab attached is inserted; and
  judging whether some other medium is being reproduced to perform the reproduction of an image when the magnetic tape medium without the tab is inserted.

19. The method of claim 14, wherein, in the automatically switching, it is judged whether some other medium is being reproduced, and if no medium is being reproduced, a control signal is outputted to reproduce the currently inserted medium for reproducing an image.

20. The method of claim 14, wherein, in the automatically switching, it is judged whether one medium is being reproduced, and if the one medium is being reproduced, the VCR unit and the DVD unit are both operated in a reproduction mode and a control signal is concurrently outputted for an automatic medium switching for reproducing an image of the newly inserted second medium.

21. The method of claim 14, comprising switching or stopping the operation of the medium that is being currently reproduced, in response to a user's key input and displaying a corresponding image on a display screen.

22. The method of claim 21, wherein the switching or stopping step comprises:
  switching the current medium being reproduced to another medium and reproducing its image in response to a user's key input of a medium switching mode; and
  stopping the operation of the medium that is currently being reproduced in response to a user's input of a stop key or an eject key.

23. The method of claim 21, wherein, in the switching or stopping step, when the operation of the medium that is being reproduced is stopped, no-signal input image is displayed on the screen until a control command is input by a user's key input.

24. The method of claim 21, wherein, in the switching or stopping step, when the operation of the current medium that is being reproduced is stopped, a no-signal input image is displayed on the screen, and wherein a message that the other medium is being operated is displayed on the screen.

25. The method of claim 21, wherein the switching or stopping step comprises:
  stopping the medium being reproduced and displaying a reproduction operation status of the other medium in response to a user's key input;
  displaying a switched medium on the screen in response to a key input for the medium switching;
  stopping the operation of the switched medium being reproduced in response to a user's input of a stop key or an eject key; and
  displaying no-signal input image on the screen until a control command is inputted by a user's key input.

26. The method of claim 21, wherein the switching or stopping step comprises:
  displaying a switched medium on the screen in response to a key input for the medium switching;
  stopping the operation of the medium being reproduced in response to a user's input of a stop key or an eject key; and
  displaying no-signal input image on the screen until a control command is inputted by a user's key input.

27. The method of claim 14, wherein, in the automatically switching, it is judged whether one medium is being reproduced, and if the one medium is being reproduced, the first and second devices are both operated in a reproduction mode and a control signal is concurrently output for an automatic medium switching for reproducing an image of the newly inserted second medium.

28. A composite medium reproducing apparatus having first and second devices for reproducing a data recording medium, comprising: a key input unit configured to output a command signal upon receiving a user's selection command in an operation mode; and a controller configured to automatically switch a reproducing operation according to a new medium insertion into the first device while the second device is currently performing the reproducing operation.

29. The apparatus of claim 28, wherein when the new medium is inserted, the controller outputs a control signal to the second device corresponding to the command signal of the key input device.

30. The apparatus of claim 29, wherein when the new medium is inserted, the second device maintains a reproduction mode, and wherein the controller sets the reproducing operation to the second device and stops the reproducing operation of the first device upon receipt of a switch command signal from the key input device.

31. The apparatus of claim 30, wherein the first device outputs a null signal upon receipt of a stop/eject command.

32. The apparatus of claim 28, wherein the second device maintains a reproduction mode, and wherein the controller display a message using a display device upon receipt of a stop/eject command for the first device.

33. The apparatus of claim 32, wherein the controller sets the reproducing operation to the second device and stops the reproduction mode of the first device upon receipt of a switch command signal from the key input device.

34. The apparatus of claim 33, wherein the second device outputs a null signal upon receipt of a stop/eject command.

35. The apparatus of claim 28, further comprising:
  a selector that selects an output value received from the first device or from the second devicce under the control of the controller and outputs a video signal and an audio signal;
  an image/sound output device that outputs a video and audio reproduction signal upon receiving the output value from the selector; and an input device that provides a video signal and an audio signal input from an external device to the apparatus.

36. The apparatus of claim 28, wherein the controller comprises:
a first microcomputer that controls operations of the first device; and
a second microcomputer that controls operations of the second device in association with the first microcomputer.

37. A control method of a composite medium reproducing apparatus having first and second devices for reproducing a data recording medium, comprising:
receiving a user's selection command in an operation mode to perform reproducing of a first medium in the first device; and
automatically switching the reproducing when a second medium is inserted into the second device and the first device is performing the reproducing of the first medium.

38. The method of claim 37, wherein the first medium reproduction in the first device comprises:
reading a data recorded on the optical recording medium and outputting a corresponding reproduction signal;
decoding the reproduction signal and outputting a video signal and an audio signal; and
receiving the decoded video and audio signals and outputting them to a display device.

39. The method of claim 37, wherein the first medium reproduction in the second device comprises:
reading a data recorded on the magnetic tape medium and outputting a corresponding reproduction signal;
receiving the reproduction signal and outputting video and audio signals which have been converted to a format recognizable by an outer device; and
receiving the video and audio signals and outputting them to a display device.

40. The method of claim 37, further comprising, in the automatically switching step, when the second medium is a magnetic tape medium, judging whether the second medium is for reproduction-only depending on attachment of a tab, wherein when the tab is attached, a signal for recording or reproducing a video signal and an audio signal is output, and wherein when the tab is removed, a signal for performing a reproduction is output.

41. The method of claim 40, further comprising:
remaining in a standby mode until a control command is input by a user's key input when the magnetic tape medium with the tab attached is inserted; and
judging whether some other medium is being reproduced to perform the reproduction of an image when the magnetic tape medium without the tab is inserted.

42. The method of claim 37, wherein, in the automatically switching, it is judged whether some other medium is being reproduced, and if no medium is being reproduced, a control signal is output to reproduce the currently inserted medium for reproducing an image.

43. The method of claim 37, comprising switching or stopping the operation of the medium that is being currently reproduced, in response to a user's key input and displaying a corresponding image on a display device.

44. The method of claim 43, wherein the switching or stopping step comprises:
switching the current medium being reproduced to another medium and reproducing its image in response to a user's key input of a medium switching mode; and
stopping the operation of the medium that is currently being reproduced in response to a user's input of a stop key or an eject key.

45. The method of claim 43, wherein, in the switching or stopping step, when the operation of the medium that is being reproduced is stopped, no-signal input image is displayed on the display device until a control command is input by a user's key input.

46. The method of claim 43, wherein, in the switching or stopping step, when the operation of the current medium that is being reproduced is stopped, a no-signal input image is displayed on the display device, and wherein a message that the other medium is being operated is displayed on the display device.

47. The method of claim 43, wherein the switching or stopping step comprises:
stopping the medium being reproduced and displaying a reproduction operation status of the other medium in response to a user's key input;
displaying a switched medium on the display device in response to a key input for the medium switching;
stopping the operation of the switched medium being reproduced in response to a user's input of a stop key or an eject key; and
displaying no-signal input image on the display device until a control command is inputted by a user's key input.

48. The method of claim 43, wherein the switching or stopping step comprises:
displaying a switched medium on the display device in response to a key input for the medium switching;
stopping the operation of the medium being reproduced in response to a user's input of a stop key or an eject key; and
displaying no-signal input image on the display device until a control command is inputted by a user's key input.

* * * * *